Patented Dec. 6, 1932

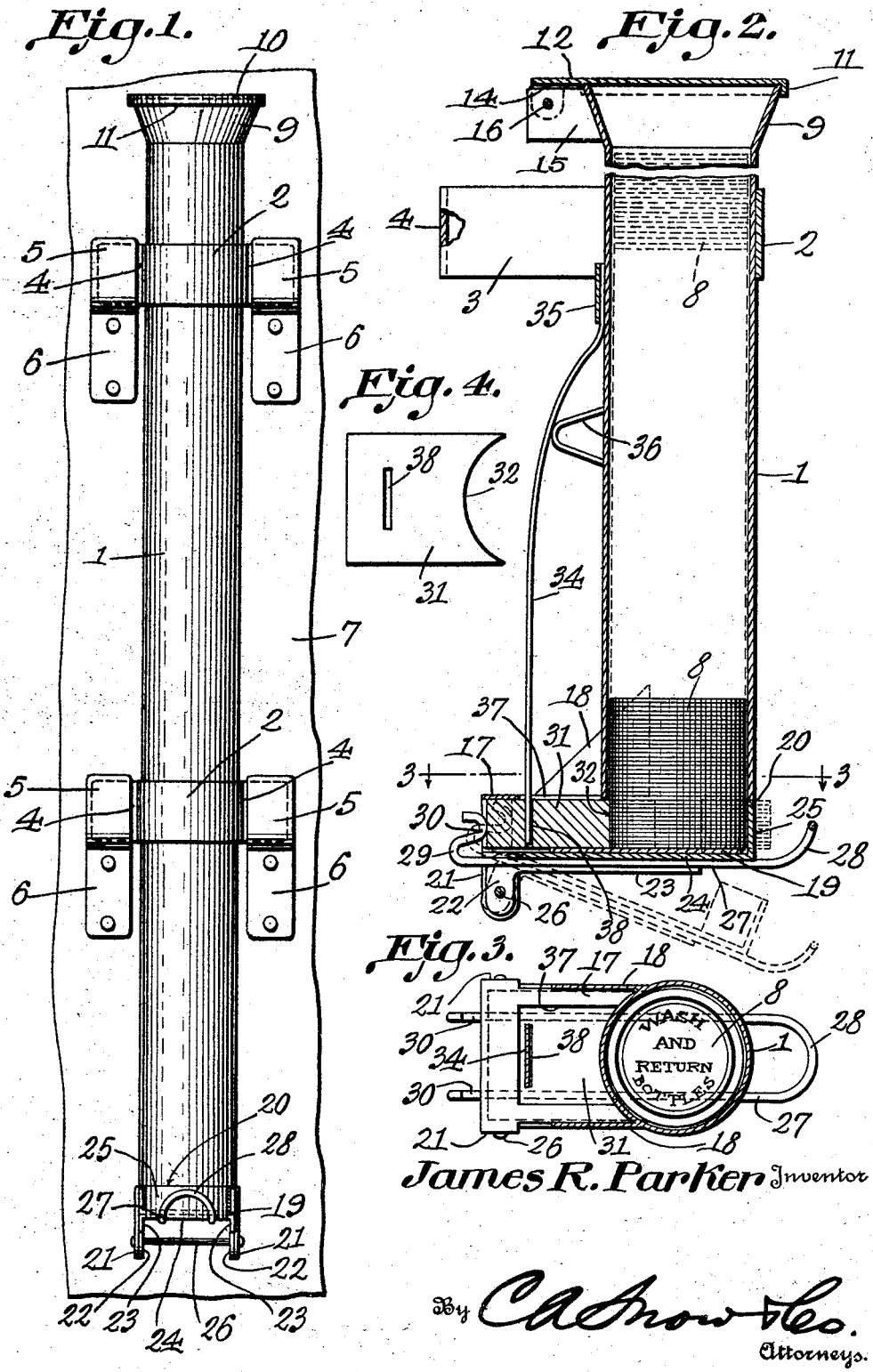
Dec. 6, 1932.     J. R. PARKER     1,889,875
MILK CAP DISPENSER
Filed April 21, 1932
James R. Parker, Inventor
By C. A. Snow & Co.
Attorneys.

1,889,875

UNITED STATES PATENT OFFICE

JAMES R. PARKER, OF RUSSELLVILLE, ARKANSAS

MILK CAP DISPENSER

Application filed April 21, 1932. Serial No. 606,729.

This invention aims to provide a simple means whereby a large number of milk bottle caps, commonly made of paste-board, may be housed, protected from dirt, until ready for use, novel means being provided for ejecting a number of these caps when it is desired to use them.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows, in front elevation, a device constructed in accordance with the invention;

Fig. 2 is a vertical longitudinal sectional view, wherein parts are broken away;

Fig. 3 is a transverse section on the line 3—3 of Fig. 2;

Fig. 4 is a top plan of the ejector.

In carrying out the invention, there is provided a tubular body 1, which, like the remaining parts of the device, may be made of metal. The body 1 is of such length that a whole package of milk bottle caps, generally containing about five hundred caps, may be emptied into it. The internal diameter of the body 1 is such that the caps will fit reasonably close in the body, without friction enough to prevent the caps from sliding downwardly in the body, as one group of caps after another is ejected from the lower end of the body.

Curved cross pieces 2 are disposed transversely of the body and are secured thereto, the cross pieces having rearwardly-projecting arms 3, provided with outstanding fingers 4, received detachably behind the offset upper ends 5 of brackets 6, secured to any accessible vertical support 7, such as a wall or portion of a bottling table. The milk bottle caps are designated by the numeral 8, and in order that they may be conveniently introduced into the body 1, the body 1 is provided at its upper end with a flared mouth 9, closed to keep out dirt, through the instrumentality of a lid 10 having a marginal flange 11 which surrounds the upper end of the mouth 9. The lid 10 is provided with an extension 12 having depending hinge wings 14, located on opposite sides of a projection 15 extended horizontally from the mouth 9 of the body 1, a pivot element 16 connecting the wings 14 with the projection 15, so that the lid 10 can be swung vertically, to and from closed position. The pivot element 16 is set far enough from the mouth 9 of the body 1 so that when the lid 10 is opened, the lid will be out of the way, and will not interfere with the introduction of the milk bottle caps 8 into the body 1.

A transverse chute 17 is secured to the lower end of the body 1, and is a box-like structure, the chute projecting backwardly and beyond the body 1, as Fig. 2 will show. Triangular braces 18 connect the projecting portion of the chute 17 with the body 1. The bottom 19 of the chute 17 extends under the lower end of the body 1, to support the milk bottle caps 8. There is an opening 20 in the outer end of the chute 17, the upper edge of this opening being defined by the lower edge of the body 1.

At its inner end, the bottom 19 of the chute 17 is provided with downwardly extended ears 21, between which are located ears 22 on the depending, reenforcing flanges 23 of a plate-like member 24, forming part of an angular lever. At the outer end of the lever member 24 there is an upwardly extended lip 25, adapted to be received in the opening 20 of the chute 17. The lip 25 is curved to conform to the transverse curvature of the tubular body 1 and is disposed in vertical alinement with the wall of the body 1, as Fig. 2 will show. A pivot element 26 connects the ears 22 of the lever member 24 with the ears 21 of the chute 17.

The lever hereinbefore referred to comprises not only the plate-like member 24, but also a U-shaped handle 27, the side arms of which are secured to the lower surface of the member 24. The handle 27 is used not only as a means for manipulating the lever, but, also, as a reenforcement for the plate-like member 24.

The curved outer end of the handle 27 forms a finger piece 28, projecting outwardly beyond the lip 25 on the lever member 24, and having an upward curvature, as Fig. 1 will show. The rear ends of the arms of the handle 27 are S-shaped, as shown at 29, so as to form transversely spaced, forwardly extended, rounded arms 30, operating through the open rear end of the chute 17.

The rounded ends 30 of the part 27 of the operating lever bear against an ejector 31, mounted for right line sliding movement in the chute 17. Figure 4 shows that the inner end 32 of the ejector 31 is concaved, to conform to the periphery of the milk bottle caps 8. The ejector 31 is moved to the left, into the position of Fig. 2, by a spring tongue 34, although some other means for operating the ejector might be provided. The spring tongue 34 extends lengthwise of the tubular body 1, and the upper end of the spring tongue is held on the body, in a socket 35 on the body. Throughout practically its entire length, the spring tongue 34 is spaced from the body 1, and near to the socket 35, the spring tongue is flexed across an outwardly projecting spacing bracket 36, carried by the body. The lower part of the spring tongue 34 has ample room to work in an opening 37 formed in the top of the chute 17, the extreme lower end of the spring tongue being detachably received in a slot 38 which is formed in the ejector 31.

With the parts arranged as shown in Fig. 2, the body 1 is slid upwardly with respect to the support 7 until the fingers 4 on the body are disengaged from the ends 5 of the bracket 6 on the support. The lid 10 is opened, and an entire package of milk bottle caps is placed in the body 1. Sometimes it may be convenient to turn the body 1 end for end, and slide it downwardly over the package of milk bottle caps, the body being turned end for end, to the position of Fig. 2, and the covering for the stack of milk bottle caps being pulled out of the body 1. These, however, are matters that the operator can handle to suit himself. The body 1 is assembled again with the support 7 by engaging the fingers 4 of the body with the ends 5 of the brackets 6, the stack of milk bottle caps being supported on the bottom 19 of the chute 17. The spring tongue 34 tends to move the ejector 31 to the left, into the position of Fig. 5, and the ejector, bearing against the parts 30 of the lever 27—24, carries the member 24 of the lever to the position of Fig. 2, with the lip 25 of the member 24 closing the opening 20 in the outer end of the chute 17.

The opening 20 may be of any desired height, but it is suggested that its height be equal to the thickness of twelve of the milk bottle caps 8, because that number conveniently can be used at once in capping the milk bottles.

By means of the finger piece 28, the lever 27—24 is swung downwardly on its fulcrum 26, against the action of the spring tongue 34, the parts 30 of the lever carrying the ejector 31 forwardly, the spring tongue 34 being flexed. The ejector 31, as it moves to the right, carries forward the predetermined number of milk bottle caps through the opening 20, the lip 25 on the lever member 24 moving downwardly, clear of the opening 20, as the lever is swung downwardly. The ejected milk bottle caps are received in the hand of the operator that is used to manipulate the lever. When the end 28 of the lever is released, the spring tongue 34 restores the parts to the position of Fig. 1, ready for another operation. It is to be observed that since the milk bottle caps are ejected in a stack of twelve, more or less, only the uppermost and lowermost caps that are ejected are likely to be soiled. The soiling of the uppermost cap is of no particular consequence, because it is the outer or upper surface of that cap which is exposed, and not the inner surface that comes next to the milk.

As a matter of fact, it is the lower surface of the lowermost cap, only, that has any sliding contact with the part of the machine, during the operation thereof, and the result is that a maximum number of milk bottle caps are delivered in an unusually clean and uncontaminated condition.

Having thus described the invention, what is claimed is:

A device for dispensing milk bottle caps, comprising a tubular body, a box-like transverse chute at the lower end of the body and including a top, and a bottom extended across the lower end of the body, the chute having a first opening in its top and a second opening at its outer end, a block-like ejector slidable in the chute, toward and away from the second opening and having a transverse slot, an operating lever including a plate-like member located underneath the bottom of the chute and provided at one end with an upwardly-extended lip forming a closure for the second opening, when the plate-like member is swung upwardly against the bottom of the chute, means for pivoting the plate-like member at one end upon the chute, the lever including a handle secured to the under surface of the plate-like member and reenforcing the same, one end of the handle projecting beyond the lip, to form a finger piece, the opposite end of the handle being fashioned into an upstanding arm engaging one end of the ejector, a socket on the body, near to the upper end thereof, an outstanding spacing bracket on the body, below the socket, and a spring tongue extended longitudinally of the body, the upper end of the spring tongue being received in the socket, the lower end of the spring tongue extending downwardly through the first opening in the top of the chute and into the slot of the ejector, the spring tongue being flexed in its intermediate portion across the bracket.

In testimony that I claim the foregoing as my own, I have hereto affixed my signature.

JAMES R. PARKER.